Feb. 19, 1963 J. M. SLOUGH 3,078,080
WATER COOLING TOWER
Filed July 25, 1957 5 Sheets-Sheet 1

INVENTOR.
JACK M. SLOUGH
BY
ATTORNEY

Feb. 19, 1963   J. M. SLOUGH   3,078,080
WATER COOLING TOWER
Filed July 25, 1957   5 Sheets-Sheet 2
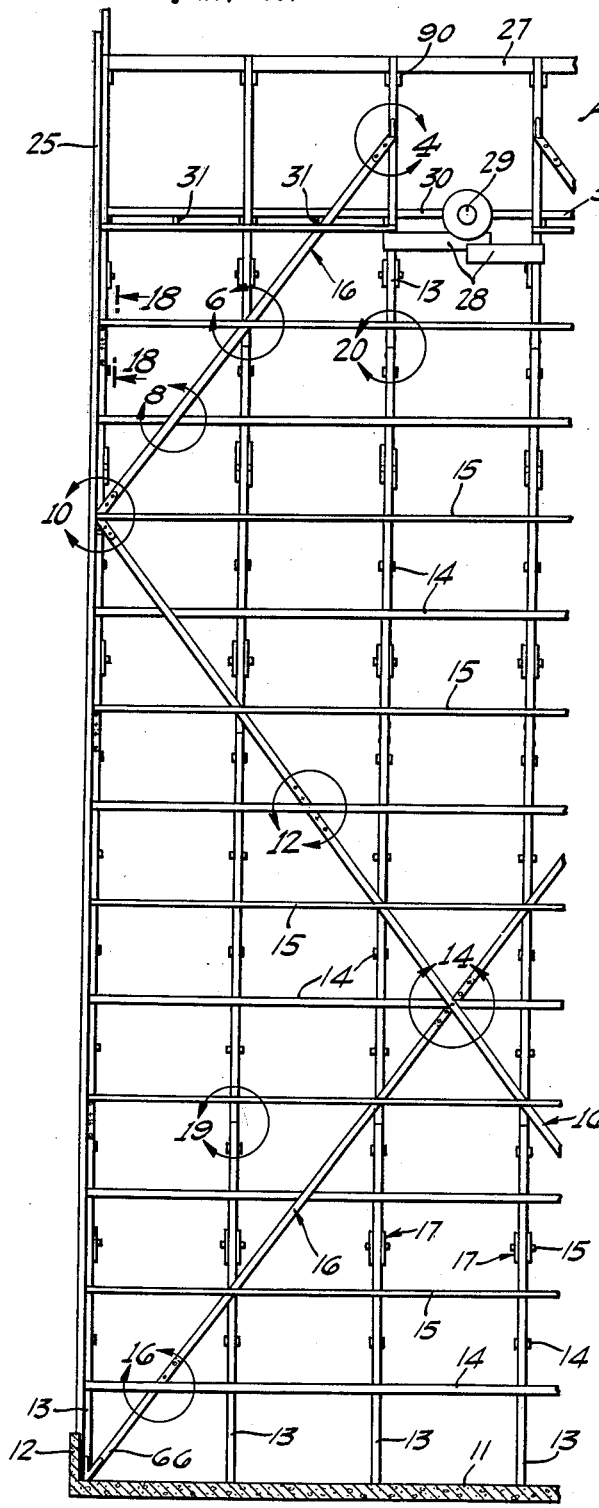
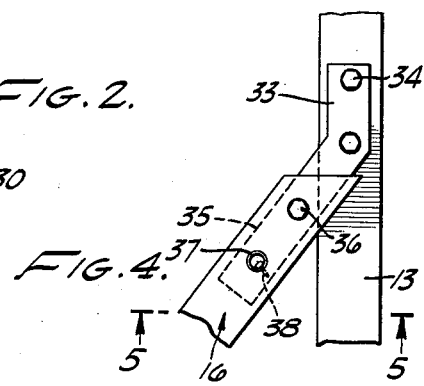
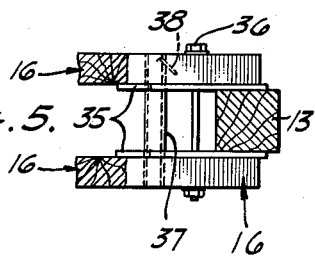
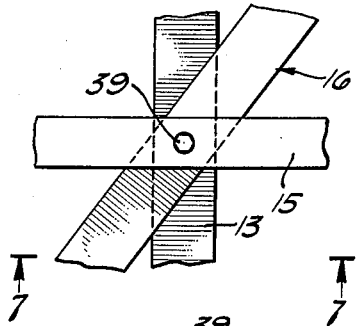
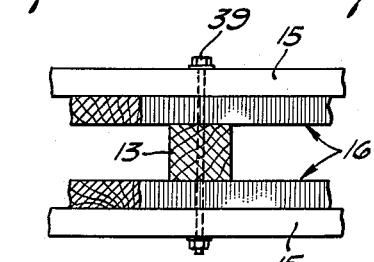
INVENTOR.
JACK M. SLOUGH
BY
ATTORNEY

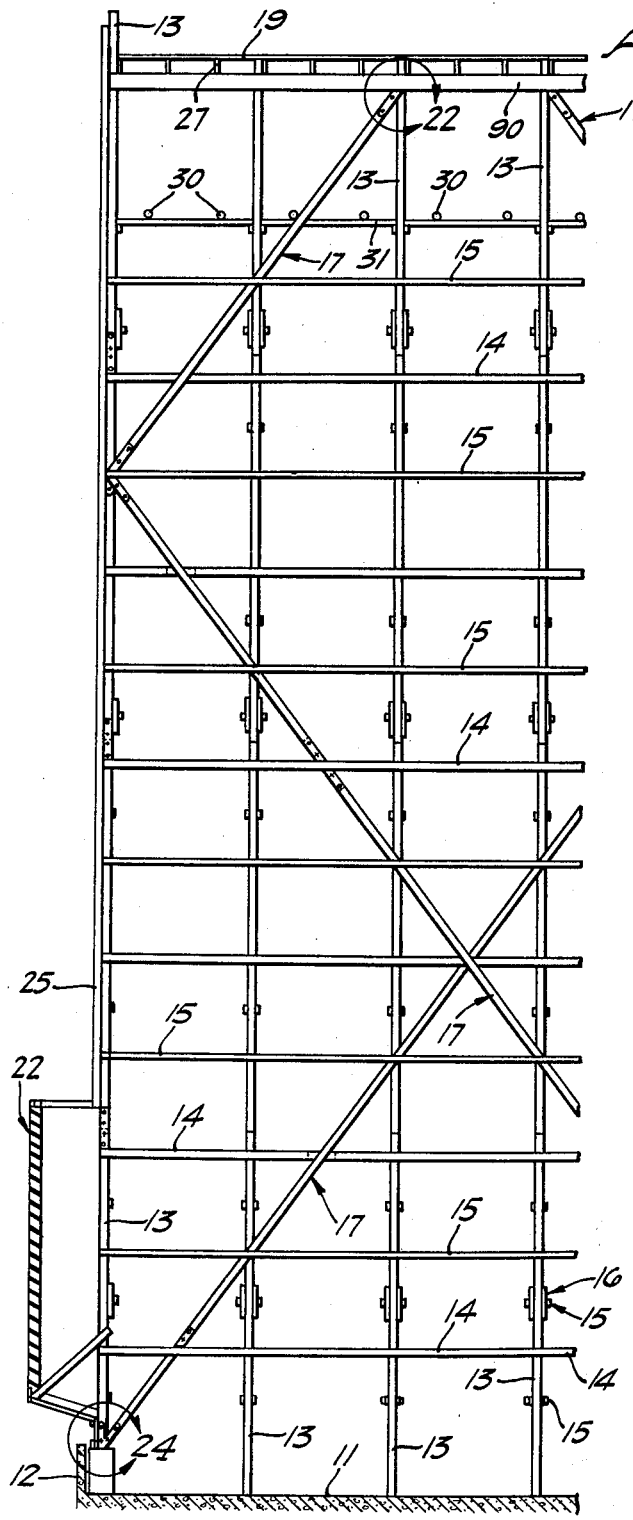
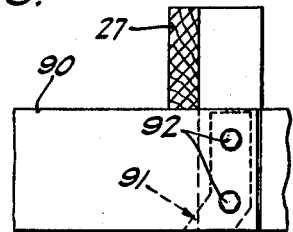
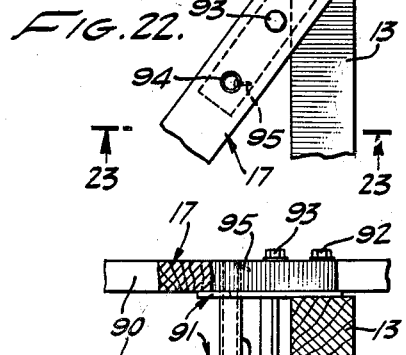
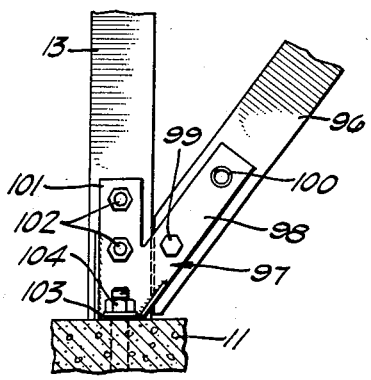

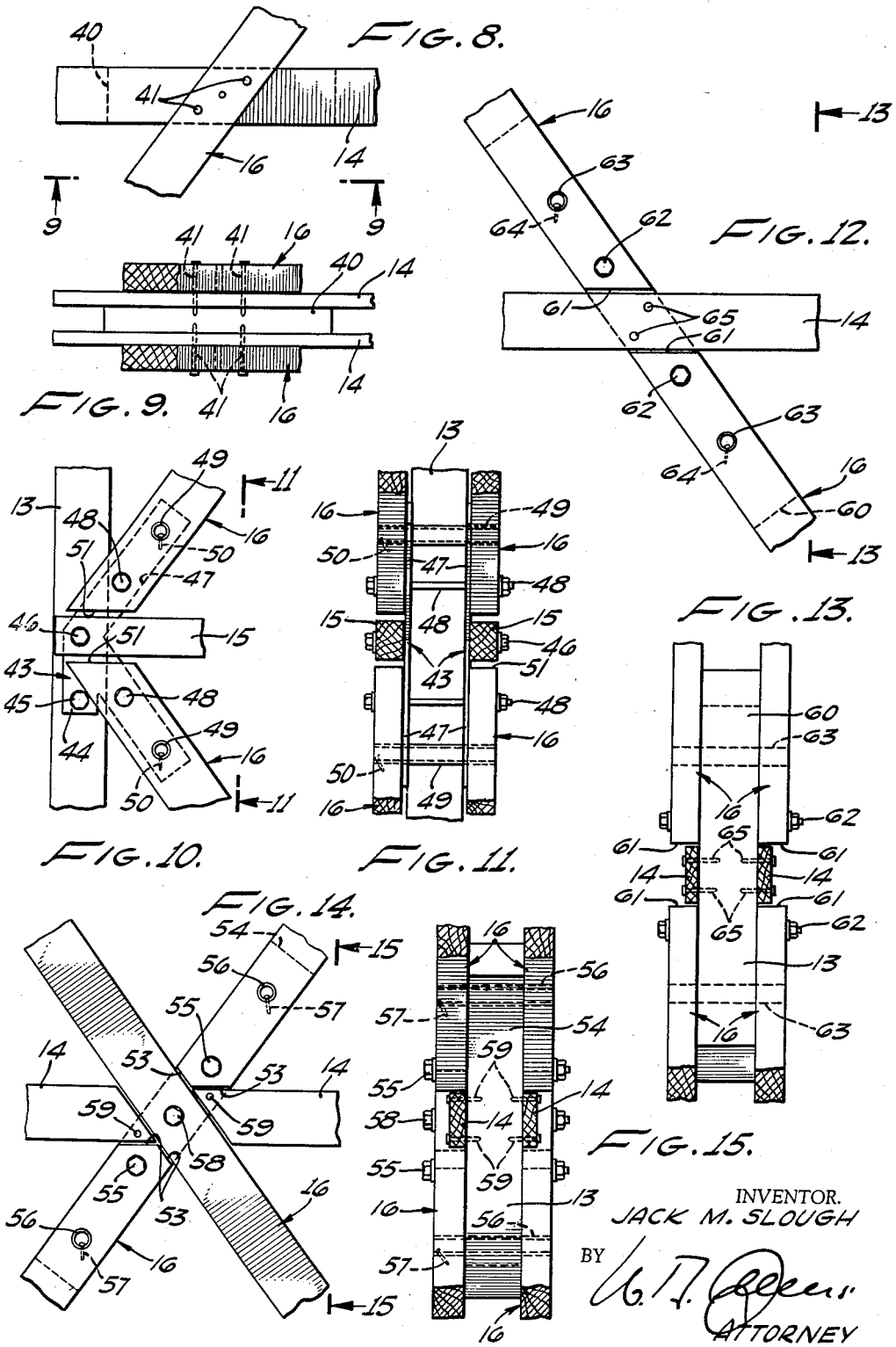

Feb. 19, 1963  J. M. SLOUGH  3,078,080
WATER COOLING TOWER
Filed July 25, 1957  5 Sheets-Sheet 5

INVENTOR.
JACK M. SLOUGH
BY
ATTORNEY

United States Patent Office 3,078,080
Patented Feb. 19, 1963

3,078,080
WATER COOLING TOWER
Jack M. Slough, West Covina, Calif., assignor, by mesne assignments, to George Windeler Co., Ltd., San Francisco, Calif., a corporation of California
Filed July 25, 1957, Ser. No. 674,038
2 Claims. (Cl. 261—109)

This invention relates to devices for cooling water and more particularly to an improved water cooling tower constructed principally of wooden structural members arranged in a unique manner and rigidly interlocked in assembled relation by simple but highly effective joint structures.

Water cooling towers have been utilized for many years to lower the temperature of water, cascading the water in intimate counter-flow relation with a stream of air, the cooling being produced mainly by the evaporation of a portion of the water into the air. Usually the water passes by gravity downwardly through a maze of flow-diverting and air distributing grids supported at spaced intervals vertically of a tower structure as air is circulated upwardly through the tower. Cooling capacity requirements for many industrial purposes are so great that cooling tower structures are now commonplace having a height as great as 75 feet and lengths on their longer sides up to many times that dimension. It will therefore be appreciated that the design of such large structures capable of long and inexpensive service and having the requisite strength to withstand both normal operating stresses and those imposed by high wind and adverse weather conditions presents problems worthy of serious consideration. In the interest of economy and efficient design, the size of each structural or load carrying member should be carefully selected, taking into account various important factors including the strength characteristics of the wood employed, the distance between supports, and, in particular the means for interconnecting crossing elements and for splicing the adjacent ends together. Such splices and connections are referred to below variously as splices, joint structures and connectors.

The cooling tower of the present invention is characterized by the use of a minimum number of different sizes of components, by the simplicity of the joints between components, and by the absence of close fitting abutments between the ends of the members and the juxtaposed surfaces of adjacent members. The accurate cutting of the brace ends is avoided by the use of a specially designed joint assembly wherein no reliance is placed upon surface contact between the ends of bracing members and any other structural elements. Instead, the load stresses are transmitted between bracing members or between such members and the upright posts by way of specially designed metal coupling members of simple construction including straps, tubular pins and through bolts. The only processing operations required in a single one of the wooden elements to accommodate the joint fasteners is the provision of holes for a single bolt and a single tubular pin, these holes being accurately spaced to register with similar holes in mating components of the joint. This contrasts sharply with prior joints requiring far more involved preparatory steps preliminary to the assembly of various threaded fasteners costly to provide as well as to assemble.

In the joint structures provided by this invention, a single through bolt provides all the required clamping action and a snug fitting tubular bearing pin serves to lock the members against pivotal movement axially of the bolt and additionally provides a large area load-transmitting bearing between the brace member and the structural member to which it is connected. The significance of this will become apparent below where it is pointed out that the bracing members are employed primarily to carry substantially all loads in longitudinal tension or compression. The large diameter tubular bearing pins are found better suited to transmit such loads than are the much smaller diameter bolts, the bodies of which have such small bearing contact with the bracing members as to concentrate excessive loads on the portions of the wood in contact therewith. Further, as suggested above, the tubular pins are assembled quickly within the snug fitting openings without need for screw fasteners, and are anchored in place by driving a nail or the like into the brace through a receiving opening accessible at the tube end.

Accordingly, it is a primary object of the present invention to provide an improved cooling tower structure from pre-formed wooden components held together by joint structures of superior types.

Another object of the invention is the provision of a water cooling tower having a skeleton consisting of upright posts arranged in rows at right angles to one another and rigidly interconnected by horizontal cross bracing crossing the tower lengthwise and transversely thereof at vertically spaced intervals.

Another object of the invention is the provision of a cooling tower wherein the rows of upright posts in each transverse direction are straddle braced by pairs of diagonal bracing members arranged for the balanced transmission of tension and compression loads to said posts such that no eccentric moments are produced therein and wherein the ends of individual elements are coupled together by way of an improved joint utilizing in each half thereof a single through bolt and a single tubular pin.

Another object of the invention is the provision of a water cooling tower utilizing a skeleton structure consisting of a plurality of upright wooden posts arranged in rows with individual posts formed of similar sections arranged in end-to-end relation and spliced together by a dowel pin seated partly in aligned bores axially of the abutting ends. At least certain of these post splices are formed by a tubular dowel pin the opposite ends of which are anchored to the associated post section by through bolts.

Another object of the invention is the provision of a water cooling tower constructed from wooden components comprising intersecting rows of upright posts rigidly interlocked by vertically spaced rows of horizontal cross braces and by diagonally disposed brace members held in assembled relation by a substantially equal number of through bolts and of tubular pins.

Still another object of the invention is the provision of novel joint structures and splices for rigidly interconnecting wooden elements wherein are used a minimum of metal fasteners and which may be erected with a minimum of labor.

These and other more specific objects will appear upon reading the following specification and claims and upon considering in connection therewith the attached drawings to which they relate.

Referring now to the drawings in which the preferred embodiment is illustrated:

FIGURE 2 is a fragmentary cross-sectional view taken along line 2—2 of FIGURE 1 showing structural features and particularly one set of diagonal bracing members;

FIGURE 3 is a view similar to FIGURE 2 but taken along the line 3—3 on FIGURE 1 showing details of the diagonal bracing disposed at right angles to that illustrated in FIGURE 2;

FIGURE 4 is a fragmentary view on enlarged scale of the joint encircled by arrow 4 in FIGURE 2;

FIGURE 5 is a transverse sectional view on line 5—5 of FIGURE 4;

FIGURE 6 is an enlarged fragmentary view of the joint encircled by arrow 6 in FIGURE 2;

FIGURE 7 is a transverse sectional view on line 7—7 of FIGURE 6;

FIGURE 8 is an enlarged side view of the joint encircled by arrow 8 in FIGURE 2;

FIGURE 9 is a transverse sectional view on line 9—9 of FIGURE 8;

FIGURE 10 is an enlarged fragmentary view of the joint structure encircled by arrow 10 in FIGURE 2;

FIGURE 11 is a transverse sectional view taken on line 11—11 in FIGURE 10;

FIGURE 12 is an enlarged side view of the splice structure encircled by arrow 12 in FIGURE 2;

FIGURE 13 is a transverse sectional view on line 13—13 of FIGURE 12;

FIGURE 14 is an enlarged side view of the joint structure encircled by arrow 14 in FIGURE 2;

FIGURE 15 is a cross-sectional view taken on line 15—15 of FIGURE 14;

FIGURE 22 is an enlarged view of the joint encircled by arrow 22 in FIGURE 3;

FIGURE 23 is a cross-sectional view taken on line 23—23 of FIGURE 22; and

FIGURE 24 is an enlarged side view of the joint structure encircled by arrow 24 in FIGURE 3.

Figure 1:
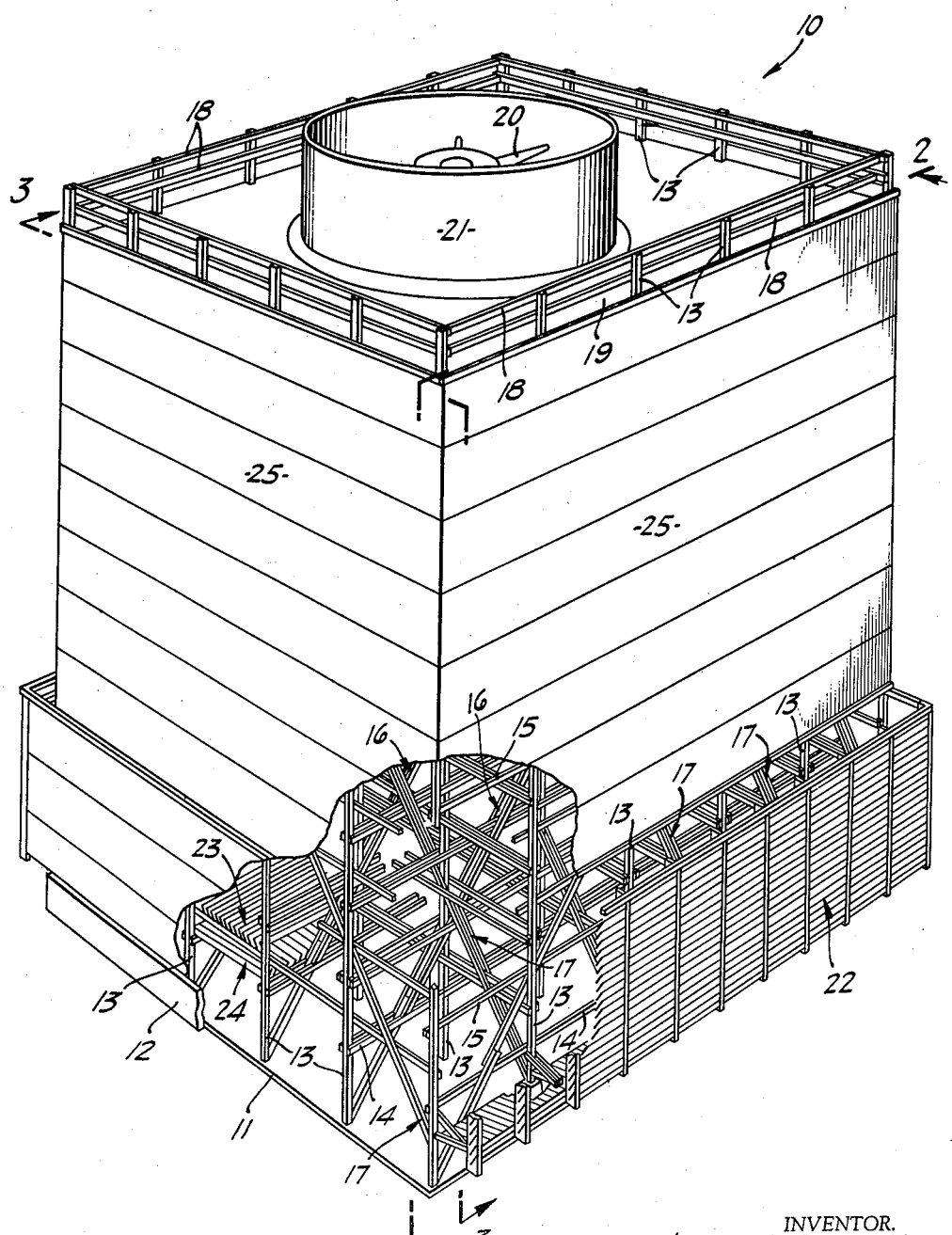
FIGURE 1 is an isometric view of a water cooling tower incorporating the present invention and showing a portion of the exterior siding and certain of the interior parts broken away to show constructional details.

Referring to the drawings and particularly FIGURE 1, there is shown a water cooling tower designated generally 10 supported on a suitable concrete foundation 11 having upturned side walls 12 providing a cool water collecting basin. The framework of the tower is constructed from wooden components held in assembled relation by a minimum number of metal fastening elements to be described in detail below. Basically, this framework comprises rows of upright posts 13 arranged at right angles and suitably spaced by equal distances such as six feet. These posts are braced horizontally in both directions by transverse bracing members spaced at suitable intervals such as four feet with the bracing extending in one transverse direction being spaced midway between the horizontal bracing extending in the other transverse direction. In the interests of maximum economy and strength, it is also desirable that alternate rows of transverse bracing members be of different size. For example, in the tower shown, alternate rows of transverse bracing members 14, 14 may be formed of one inch by four inch wooden members whereas the rows 15, 15 of bracing members to either side thereof may have a dimension of two inches by three inches. It is also pointed out that preferably the horizontal braces 14 and 15 at each level comprise a pair of identical members disposed on either side of a row of upright posts 13.

Supplementing the transverse bracing members 14 and 15 are two different sets of diagonally arranged pairs of bracing members, those interconnecting the rows of posts in one transverse direction being indicated at 16, 16 and those interconnecting rows of posts extending in the other transverse direction being indicated at 17, 17 each set being inclined in opposite directions and including a pair of members disposed on opposite sides of a row of posts. To be noted in particular in FIGURE 1 is the fact that diagonal braces 16 have their lower ends terminating at the outer row of posts and close to the level of foundation 11. In contrast, diagonal braces 17 interconnecting the other transverse rows of posts have their lower ends joined to their associated exterior rows of posts 13 at a point spaced two feet above foundation 11, or at a point midway between the foundation and the first tier of horizontal brace members 14. It is pointed out that this arrangement of the diagonal brace members at different levels is important and permits the use of diagonal braces between all posts in both directions without interference with one another at any point within the tower structure. Furthermore, and importantly, it is to be pointed out that the post bracing structure is such that the load stresses acting in all members is along straight lines between connections or splices.

From FIGURE 1 it will be noted that the outer row of posts 13 extends above the tops of all interior posts and supports an outer railing 18 at the top of the tower. The tops of the interior posts support a roof-like covering 19 and a driving motor for a large vertical-axis propeller fan 20 surrounded by a shroud or flue 21. Fan 20 is operative to draw a very large volume of atmospheric air inwardly through the louvered air inlet structure 22 on the opposite sides of the tower base and upwardly through the water and air distributing grids 23 and 24. Only two sets of the grids are illustrated in the lower left hand corner of FIGURE 1. It will be understood, however, that the cross bracing members 14 and 15 support deckings or grids across the entire tower at each level. Deckings or grids are formed by lightweight wide boards arranged in closely spaced parallel relation at an angle to the vertical with the slats forming one layer of grids 24 having their longitudinal axes extending at right angles to the grids 23 immediately above and below the same. Such grid deckings may be formed in any other conventional manner and provide large area distributing surfaces for the water understood to be flowing downwardly by gravity from spray nozzles arranged along water distributing manifolds 30 located directly beneath roof 19 of the tower. The outer sides 25 of the tower may be closed in a substantially airtight manner by suitable paneling to confine the air flow and to prevent the loss of cooled water.

Referring next to FIGURE 2 and particularly to the top of the tower structure, it will be seen that the tops of upright posts 13 are connected by joists 27 supporting a roof covering 19. At a level spaced somewhat below joists 27 and arranged between the two center rows of the posts are heavy cross members 28 supporting the different diameter sections of the incoming water header 29 from which water distributor pipes 30, 30 extend on suitable cross supports 31. Distributing branches 30 may be provided with spray heads at intervals directing the water downwardly through the decking grids 23, 24 understood to be supported by the transverse bracing members 14 and 15. Both the decking and the water distributing features of the tower are conventional and for this reason are not being illustrated or described in greater detail.

Reference will now be had to FIGURES 4 through 24 showing structural details of the various joint constructions. Referring first to FIGURES 4 and 5 there is shown a preferred method of securing the upper ends of the diagonal braces 16 to a central one of posts 13. For this purpose, use is made of a pair of flat metal straps disposed one on the opposite sides of posts 13 and having leg 33 of each secured to the posts by a pair of bolts 34. A second leg 35 of the metal straps extends parallel to the diagonal brace members 16 and flush against the inner surfaces of these members, as is clearly shown in FIGURE 5. A bolt 36 passes through openings in the end of braces 16 and through aligned openings in legs 35 of the metal straps. Tightening of this bolt clamps the two brace members firmly against the opposite sides of the straps without need for a spacer member between the inner faces of the straps due to the close proximity of the clamping bolt to the adjacent side of post 13. To prevent pivotal movement of the brace members relative to leg 35 of the straps, use is made of a large diameter metal tubing 37 snugly fitting aligned openings through brace members 16 and through legs 35 of the metal straps. The ends of tubing 37 preferably terminate flush with the outer surfaces of brace members 16 and are held in assembled position by means of a nail or the like means 38 driven into brace member 16 through a small receiving opening in the tube wall close to its end.

It will be noted that tube 37 has a diameter several times that of bolt 36 and therefore has a much larger bearing area with the side walls of the receiving opening through brace member 16. Accordingly, it will be recognized that tubing 37 cooperates with bolt 36 in performing several functions. Not only does the tubing hold the brace member assembled to the legs of the metal straps but it prevents pivotal movement of the brace members about the bolt and provides a wide area bearing for receiving the forces acting lengthwise of members 16. A single bolt is sufficient to clamp the brace members to other means such as strap leg 35 with all the strength which can be developed or transmitted by the wooden members. For this reason it has been found that there is no point in providing one or more additional bolts. Instead it has been found far more effective to provide a large diameter metal tube arranged as indicated at 37 for preventing pivotal movement of the brace members in a vertical plane. Such a tube as has been suggested above is superior to the bolt for this purpose in that it provides a large bearing surface for absorbing tension and compression loads acting lengthwise of the brace member and effective to transfer these forces through the legs 35 of the strap members to another member such as post 13.

FIGURES 6 and 7 represent the joint structure encircled by arrow 6 in FIGURE 2 and show how an intermediate portion of the brace members 16 is typically secured to a post 13 at the point where this post is traversed by one set of horizontal brace members 15. The diagonal brace members are preferably positioned flush against the opposite surfaces of the upright posts with the horizontal brace members 15, 15 passing flush against the outer faces of the diagonal braces and clamped thereto and to post 13 by a single through bolt 39.

FIGURES 8 and 9 show the simple joint structure employed where the diagonal members 16 cross horizontal members 14 at a point between a pair of upright posts 13, as indicated by arrow 8 in FIGURE 2. Since it is undesirable to transfer load stresses in any substantial amount between the brace members at this point, it suffices to insert a spacer block 40 parallel to and between members 14 opposite the crossing point of braces 16 and nailing the assembly together as by nails 41. It will be understood that a bolt may be used for this purpose although it is quite unnecessary due to the proximity of this area of the braces to the strong joint structures provided at junctions with the nearby upright posts. It is also found practicable to use a spacer block 40 of half the thickness of post 13 since the relatively thin members 14 are easily deflected toward one another the slight distance to accommodate the thinner spacer block.

FIGURES 10 and 11 show the joint structure preferably used to join oppositely inclined diagonal braces 16 to one of the upright posts 13. This joint structure is very similar to that described above in FIGURES 4 and 5 with the exception that the pair of metal straps 43 employed have three legs rather than two. As in the case of the joint shown in FIGURES 4 and 5, legs 44 of the strap lie flush against the sides of a post 13 to which they are rigidly secured by bolts 45 and 46. Note that bolt 46 also passes through the ends of a pair of the horizontal brace members 15. Legs 47 of metal straps 43 lies parallel to and flush against the inner surfaces of the ends of members 16, the latter being rigidly secured to these legs in the same manner described in connection with FIGURES 4 and 5, using a single bolt 48 positioned close to the inner side of post 13. In addition, a pair of metal tubing members 49, 49 identical with tubes 37 described above fit snugly in openings near the outer ends of legs 47. These tubes are locked in assembled position by means of a single nail 50 driven at an angle through a receiving hole close to one end of the tubes. The ends of brace members 16 are preferably cut off at an angle as indicated at 51 but it will be understood these bias-cut end surfaces are not intended to lie flush against any other member such as the opposite sides of members 15.

FIGURES 14 and 15 show the type of joint structure employed at the intersection of oppositely inclined brace members as is indicated by the circle arrow 14 on FIGURE 2. The pair of diagonal braces inclined downwardly to the right extend across the intersection without a break, whereas the other pair extending downwardly to the left as viewed in FIGURE 2 have their double bias cut ends 53 spaced on the opposite sides of the first or through pair of braces. A splice block 54 having the same thickness as posts 13 is inserted across the ends of the severed pair of member 16 so as to lie parallel thereto and the ends of the severed brace members are rigidly clamped to the opposite ends of this splice block by a pair of bolts 55 and a pair of tubes 56, the latter being anchored in assembled position by nails 57. The unsevered pair of brace members 16 crossing downwardly to the right are clamped to the mid-portion of splice block 54 by a bolt 58, and the triangularly cut ends of horizontal braces 14 are nailed to the splice block by nails 59.

FIGURES 12 and 13 show a preferred manner of splicing sections of long brace members 16. As shown, this splice is made at a point of intersection with horizontal braces 14 but it will be understood that the splice may be made at any point along the diagonal braces. In general, the splice is made as described with respect to FIGURES 14 and 15 in that a splice block 60 having the same width as posts 13 is sandwiched between and across the adjacent ends of brace sections 16, 16. These ends may be bias cut as is indicated at 61 so as to lie closely spaced from the upper and lower edges of members 14, but are preferably out of contact therewith. The ends of each of the brace members is clamped to the splice block by a single bolt 62 supplemented by a large diameter metal tube 63 secured in assembled position by a nail 64. Members 14 are secured to the mid-portion of splice block 60 as by nails 65.

Figures 16, 17:
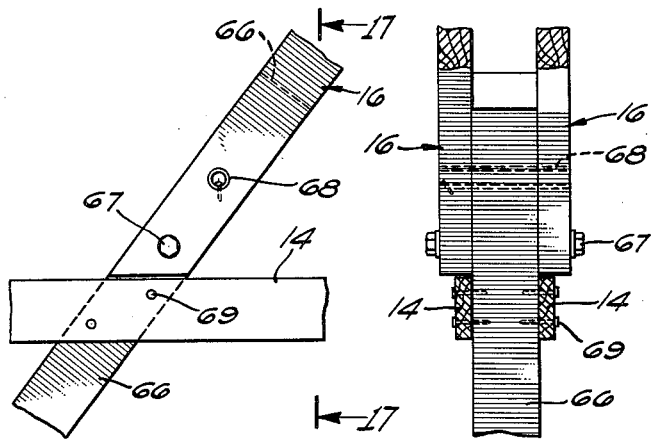
FIGURE 16 is an enlarged side view of the joint structure encircled by arrow 16 in FIGURE 2.
FIGURE 17 is a transverse sectional view taken on line 17—17 of FIGURE 16.

FIGURES 16 and 17 show the important joint structure between the lower ends of the diagonal braces and the lower ends of posts 13. This joint will be best understood by reference to FIGURE 2 taken with FIGURES 16 and 17 from which it will be noted that use is made of a splice block 66 having a length of several feet. Its upper end is clamped between the lower ends of a pair of brace members 16 by means of a bolt 67 and a tubing pin 68 arranged in the same manner described in connection with FIGURES 4 to 15. Note that the ends of members 16 terminate close to the upper edge of the lower set of braces 14, the latter being nailed or otherwise secured to the opposite sides of splice block 66. The manner in which the lower end of the block 66 is anchored to posts 13 is similar to that described in connection with FIGURES 21 and 24.

Figure 18:
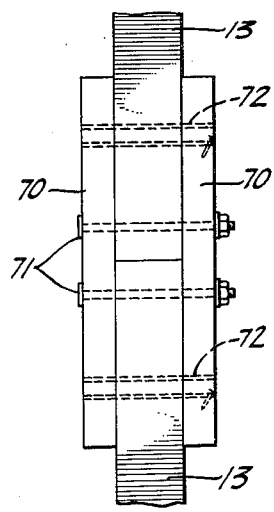
FIGURE 18 is a view taken along plane 18—18 of FIGURE 2 showing one type of splice between top sections of the upright posts.

FIGURE 18 shows a preferred manner of splicing the adjacent ends of sections of exterior ones of upright posts 13. These joints employ a pair of splice blocks 70, 70 clamped rigidly against the opposite surfaces of a pair of abutting sections of posts 13, 13 by means of a pair of bolts 71 and a pair of tubes 72, the latter being spaced above and below bolts 71.

Figures 19, 20:
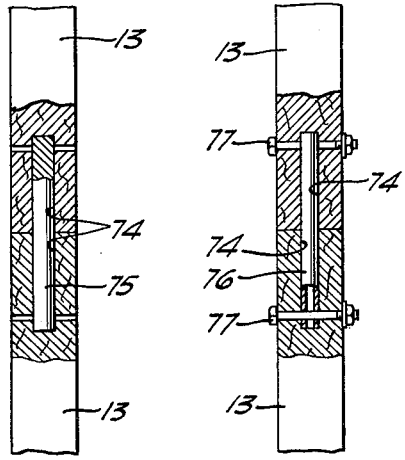
FIGURE 19 is an elevational view with portions broken away showing a type of splice between sections of the upright posts as employed in a lower interior part of the tower as indicated by the circle arrow 19 in FIGURE 2.
FIGURE 20 is a view similar to FIGURE 19 but showing a splice between sections of an upright post located interiorly of the tower.

FIGURES 19 and 20 show the joints used to join sections of upright posts at other points in the tower structure and particularly interiorly thereof. For example, joint 19 located between the outer row of posts and one of the two center rows must be sufficiently strong to support the air circulating fan and its driving motor. Joints in the former posts are interconnected by the type of joint illustrated in FIGURE 19, whereas the joints between sections of the posts underlying the air circulating fan are illustrated in FIGURE 20. With reference to FIGURE 19, it is pointed out that the abutting ends of the post sections are provided with aligned bores 74 tightly seating a wooden dowel pin 75. If desired, the latter may be glued in assembled position or reliance may be had merely on a tight frictional fit. The ends of the post sections shown in FIGURE 20 are provided with similar aligned bores 74 frictionally seating a section of metal tubing 76 preferably locked in assembled position by bolts 77, 77 passing through aligned openings in the end of the tube and in the posts 13.

Figure 21:
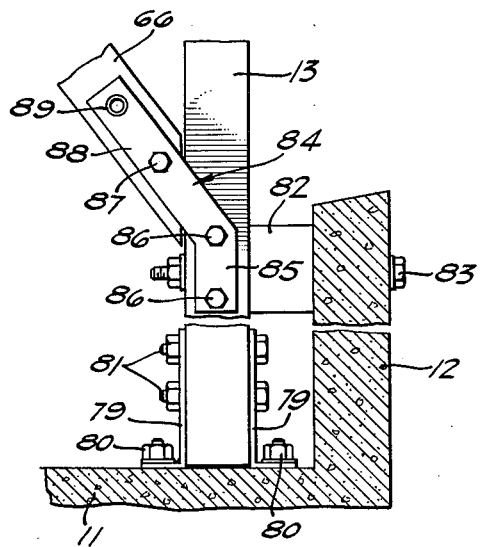
FIGURE 21 is an enlarged fragmentary view showing details of the joint between an exterior post and the lower end of a diagonal brace member.

FIGURE 1 shows one manner in which the lower ends of upright posts 13 may be anchored to the concrete foundation 11. Shown in FIGURE 21 is a post from one of the outer rows which has its lower end clamped rigidly between a pair of L-shaped metal anchor plates 79 rigidly secured to foundation 11 as by threaded fasteners 80. The bottom section of the posts is likewise rigidly clamped between the upright portions of the anchor members by bolts 81. These bolts are preferably spaced inwardly from wall 12 and a spacer block 82 is clamped between wall 12 and the side wall of the post by a bolt 83. The lower end of splice block 66 for the diagonal braces 16 is rigidly clamped to the posts as by a pair of metal plates 84 having their lower legs 85 clamped to the opposite sides of the posts by bolts 86. Bolt 87 passes between the upper leg 88 of the plates and the lower end of splice block 66. A tubing pin 89 similar to those described in connection with the previous joint structures passes snugly through aligned openings of legs 88 and of the splice block.

Referring now to FIGURES 3, 22, 23 and 24 showing the arrangement of the opposite set of diagonal braces 17, 17, it will be understood that these are identical with diagonal braces 16, 16 in that each set comprises a pair of criss-cross braces clamped against the opposite sides of each row of posts extending at right angles to the rows of posts described above in connection with bases 16, 16. The principal difference is that braces 17, 17 have their lower ends spaced two feet higher than the lower ends of diagonal braces 16. It will, of course, be understood that if the spacing between the horizontal tiers of horizontal braces is other than two feet, then the spacing of the lower ends of the diagonal braces will vary accordingly to the end that each set of diagonal braces will intersect the horizontal braces directly opposite the upright posts, rather than between the adjacent pairs of upright posts. In view of the described identity in the two sets of diagonal braces, and of the joints used throughout these two sets, it will be unnecessary to describe or to illustrate the joint structures appearing in braces 17, 17.

FIGURE 22 is generally similar to the joint shown in FIGURE 4 except that it overlaps with a heavy cross member 90 at the upper end of posts 13 and is used to support the joists for roof 19. A pair of angular metal straps 91 have their upper ends positioned beneath the inner faces of cross member 90 and the entire assembly is clamped rigidly to posts 13 by bolts 92. The two diagonal brace members 17, 17 are rigidly clamped against the outer faces of straps 91 by a bolt 93 and they are anchored against pivotal movement about this bolt by a metal tube 94 keyed in assembled position as by a nail 95.

FIGURE 24 corresponds to FIGURE 21 and shows how the square splice block 96 corresponding to splice block 66 for braces 16 is secured to the lower end of an outer post 13. The type of joint employed is the same as described throughout the structure except that anchor plates 97 have the slightly different configuration illustrated in FIGURE 24. The inclined arms 98 are secured to the opposite sides of splice block 96 by a bolt 99 and a tubing pin 100, and the two vertical legs 101 of the plates are clamped against the opposite faces of posts 13 by a pair of bolts 102. The out-turned lower ends 103 of the anchor plates seat against the top of concrete wall 12 and are secured thereto as by threaded fastener 104.

There remain to be pointed out certain characteristics and features of the described structure. To be noted in particular is the fact that all transverse rows of upright posts are interconnected by closely spaced horizontal rows of cross bracing members serving additionally to support louvered grid decking elements functioning to distribute the water over a wide surface as well as to direct the up-flowing air in a circuitous path and in close wiping contact with the wet surfaces. An important cooperating feature is the presence of criss-crossing diagonal bracing comprising pairs of members disposed on the opposite sides of each transverse row of posts throughout the structure with the bracing in one direction being vertically offset from the bracing in the opposite transverse direction to avoid interference between these members. The diagonal bracing continues in a straight line from side wall to side wall or to an anchor point internally of the tower with all tensional and compressional forces acting in a straight line from end to end of the braces. All terminal ends are designed to avoid reliance on surface-to-surface contact with adjacent structural members for the transfer of stress forces, reliance being had instead upon transfer through other splice members including both wooden splice blocks and metal splice plates. Wherever possible, joint structures employ a single bolt for clamping the structural members together and rely upon a large diameter tube to prevent relative rotation about the axis of the single bolt. All joint structures are characterized by their simplicity, the small number of parts required, and the small amount of woodworking required to facilitate interlocking with other elements of the joint. Other features of the construction have been referred to above and will not be repeated at this point.

While the particular water cooling tower herein shown and disclosed in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. In a water cooling tower, the improved support structure comprising: a plurality of vertical posts arranged in generally parallel longitudinal rows with the posts in each longitudinal row aligned with posts in adjacent longitudinal rows to define transverse rows of posts extending generally perpendicular to the longitudinal rows, a plurality of tiers of generally horizontal brace members divided into a first set of succesively vertically spaced tiers extending along and connected to the posts of said longitudinal rows and a second set of successively vertically spaced tiers extending along and connected to the posts of said transverse rows with the tiers thereof positioned substantially midway between the tiers of said first set, a plurality of diagonal brace members divided into corresponding first and second groups which extend along said longitudinal and transverse rows respectively and interconnect said posts and horizontal brace members of said first and second sets respectively at intersections where said horizontal brace members and said posts cross, said horizontal and diagonal brace members being formed of pairs of spaced apart struts which straddle said posts at said intersections and horizontally disposed water and air distributing grids spanning some of said horizontal brace members of tiers of both sets.

2. In a water cooling tower, the improved support structure comprising: a plurality of vertical posts arranged in generally parallel and equally spaced apart longitudinal rows with the posts in each longitudinal row equally spaced apart and aligned with posts in adjacent longitudinal rows to define transverse rows of posts extending generally perpendicular to the longitudinal rows, a plurality of equally spaced apart tiers of generally horizontal brace members divided into a first set of successively vertically spaced tiers extending along and connected to the posts of said longitudinal rows and a second set of successively vertically spaced tiers extending along and connected to the posts of said transverse rows with the tiers thereof positioned substantially midway between the tiers of said first set, a plurality of diagonal brace members divided into corresponding first and second groups which extend along said longitudinal and transverse rows respectively and interconnect said posts and horizontal brace members of said first and second sets respectively at intersections where said horizontal brace members and said posts cross, said horizontal and diagonal brace members being formed of pairs of spaced apart struts which straddle said posts at said intersections, and horizontally disposed water and air distributing grids spanning substantially all of the horizontal brace members of the tiers of both of said sets.

References Cited in the file of this patent

UNITED STATES PATENTS

| | | |
|---|---|---|
| 572,995 | Jackson | Dec. 15, 1896 |
| 1,060,914 | Lillow | May 6, 1913 |
| 1,158,107 | Coffey | Oct. 26, 1915 |
| 1,211,446 | Horn | Jan. 9, 1917 |
| 1,368,222 | Foreman | Feb. 8, 1921 |
| 1,591,077 | Besse | July 6, 1926 |
| 1,631,156 | Ranney | June 7, 1927 |
| 1,675,635 | Bowers | July 3, 1928 |
| 1,705,598 | Wertsberger | Mar. 19, 1929 |
| 1,899,742 | Bay | Feb. 28, 1933 |
| 1,907,330 | Martin | May 2, 1933 |
| 1,916,724 | Fluor | July 4, 1933 |
| 1,920,642 | Hoffmann | Aug. 1, 1933 |
| 1,953,372 | Stillger | Apr. 3, 1934 |
| 2,181,784 | Dugan | Nov. 28, 1939 |
| 2,305,563 | Uecker | Dec. 15, 1942 |
| 2,323,844 | Sahlberg | July 6, 1943 |
| 2,455,217 | Borges | Nov. 30, 1948 |
| 2,701,398 | Bohmer | Feb. 8, 1955 |
| 2,770,846 | Findleton | Nov. 20, 1956 |
| 2,837,789 | Evans et al. | June 10, 1958 |
| 2,942,824 | Lyman | June 28, 1960 |

FOREIGN PATENTS

| | | |
|---|---|---|
| 151,332 | Great Britain | Sept. 20, 1920 |
| 276,402 | Great Britain | Aug. 24, 1927 |
| 866,693 | France | May 3, 1941 |
| 902,859 | France | Jan. 3, 1945 |

OTHER REFERENCES

Structural Members and Connections, Hool and Kinne, 1923, page 423, McGraw Hill Book Co. Inc., 2d edition.
Engineering News-Record, July 27, 1944, p. 93.